COUNTER 16

COUNTER 17

COUNTER 18

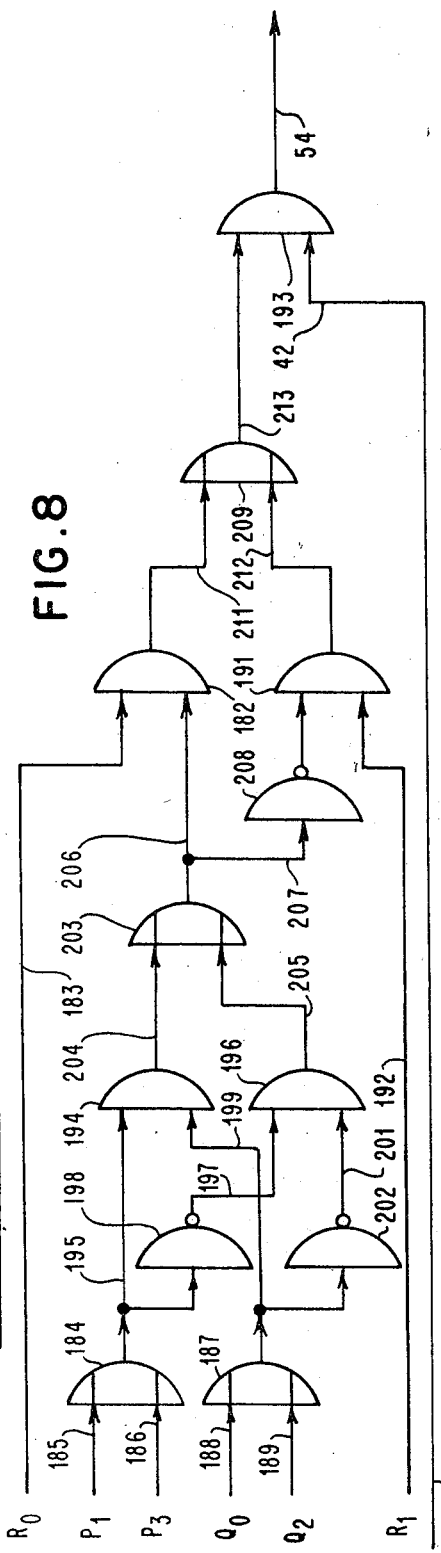
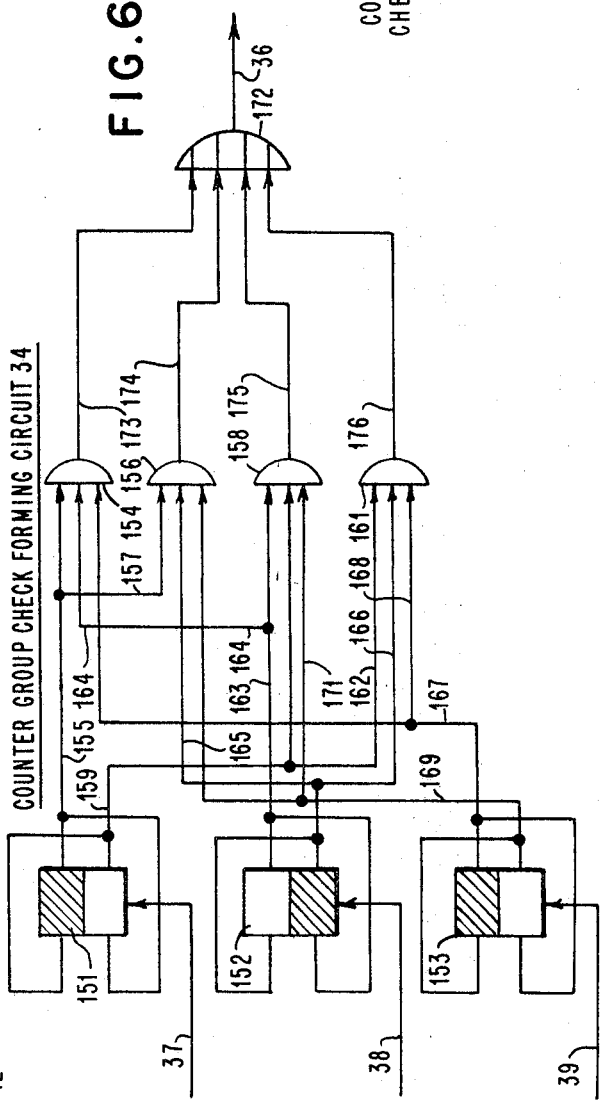
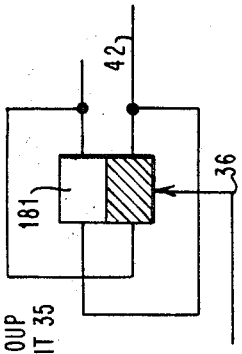

United States Patent Office 3,526,758
Patented Sept. 1, 1970

3,526,758
ERROR-DETECTING SYSTEM FOR A CONTROLLED COUNTER GROUP
Koichi Nozawa, Kawasaki-shi, Japan, assignor to Fujitsu Limited, Kawasaki, Japan, a corporation of Japan
Filed May 22, 1968, Ser. No. 731,113
Claims priority, application Japan, May 23, 1967, 42/32,716
Int. Cl. G06f 11/04; H03k 13/32
U.S. Cl. 235—153                                   6 Claims

ABSTRACT OF THE DISCLOSURE

Erroneous operation of counter control circuits and errors other than parity errors of the counters of a group of controlled counters are detected by a counter group check forming circuit connected to the counter control circuits for producing check signals in accordance with control signals supplied to the counters. A counter group check circuit connected to the counter group check forming circuit stores signals produced by the counter group check forming circuit. A counter group check completing circuit connected to the counter group check circuit and to the output of each of the counters collates the contents of the group of counters with the contents of the counter group check circuit and operates when the input signals supplied to it are in a specific pattern.

DESCRIPTION OF THE INVENTION

The present invention relates to an error-detecting system for a controlled counter group. More particularly, the invention relates to an error-detecting system for a controlled counter group of a digital system such as an electronic computer.

An electronic digital system such as an electronic computer is controlled by programs. A plurality of counters are used in the control circuit and the entire system is time controlled sequentially. That is, a number of various kinds of counters are utilized for time control in the sequence control circuits of the computer. However, errors occur occasionally in the operation of the counters and cause disruption in the sequencce of the computer. It is important that such disruption be detected immediately and that the sequence of operations of the computer be stopped immediately. If the sequence of operations is not halted, the computation will be erroneous and an erroneous answer will be produced as an output.

I have discovered, in the detection of errors in counter operation, that the counters are operated with a constant order between them, so that erroneous operation of the counters may be detected by connecting a logical circuit to a counter group for maintaining continuous supervision over the constant order of the counters. If, for example, the counters operate in an erroneous order, the logical circuit will immediately advise the erroneous operation detecting circuit of the erroneous operation. If necessary, it is then possible to halt the computation operation and start an operation sequence for correcting the error.

In a conventional computer, a parity check circuit is connected to each of the controlling counters and erroneous operations of the counters themselves are detected. However, erroneous steps of a counter caused by erroneous operation of the control circuit of the counter and erroneous operation, other than the parity of the counter, are not detected. In a system of this type computer reliability cannot be insured satisfactorily.

The principal object of the present invention is to provide a new and improved error-detecting system for a group of controlled counters.

An object of the present invention is to provide an error-detecting system for a group of controlled counters, which system overcomes the disadvantages of check systems of known type.

An object of the present invention is to provide an error-detecting system for a group of controlled counters, which system detects an error and its source with facility, rapidity, accuracy and reliability.

An object of the present invention is to provide a check system for a group of controlled counters, which check system comprises check circuits for determining erroneous operations in any of the controlled counters or control circuits for said counters.

An object of my invention is to provide a check circuit for a group of counters, which circuit responds to a combination of conditions of operation of the group of counters.

An object of the present invention is to provide a check system for determining whether the operation of each counter is abnormal, or the control signal for each counter is abnormal, by the utilization of a check circuit for confirming the operation of each counter and check circuits for checking the group of counters.

My invention eliminates the disadvantages of the conventional computer by detecting errors of the control circuit of the counter by connecting a logical check circuit to each control counter group of the control unit of the computer. My invention provides a computer of high reliability by providing a new and improved check circuit. The system of the present invention determines whether an erroneous operation is in the controlling counter or in the signal for controlling the counter by connecting a check circuit to each controlling counter for confirming erroneous operation. The system of the present invention detects the location of an error anywhere in the entire computer and erroneous operations related to data operations with facility, rapidity, accuracy and reliability.

In accordance with the present invention, an error-detecting system for a controlled counter group comprises a parity check circuit provided in each of a plurality of controlled counters and which operates when said counter indicates a certain pattern. The error-detecting system comprises a counter group check signal forming circuit for providing the group check output in accordance with control pulses supplied to the counters. A counter group check flip flop holds the output provided by the forming circuit. A group check completing circuit is operated when the contents of the counters and all the conditions of operation of the flip flops indicate a specific pattern. The pattern indicates that the contents of the counter are counted as an even number or an odd number and is determined by a known parity check circuit. The pattern is determined in advance when the computer is fabricated and therefore the counters are operated with a predetermined relation maintained between them. The counter group check signal forming circuit may thus be permanently determined when the computer is designed.

In order that the present invention may be readily carried into effect, it will now be described with reference to the accompanying drawings, wherein:

FIG. 6 is a block diagram of a counter group check forming circuit which may be utilized as the counter group check forming circuit 34 of FIG. 1;

FIG. 7 is a block diagram of a counter group check circuit which may be utilized as the counter group check circuit 35 of FIG. 1;

FIG. 8 is a block diagram of a counter group check completing circuit which may be utilized as the counter group check completing circuit 41 of FIG. 1.

The central part of the sequence control system of a computer comprises a control matrix network comprising a combination of the instruction decoder which provides the output of the instruction register and the counter decoder which provides the output of the controlling counter. This is the time control or timing control instruction part of the computer. The control matrix network is a circuit which provides the control signals of the control counters and various types of gate control signals and the computer is exclusively controlled by the output of said control matrix network.

Figure 1:
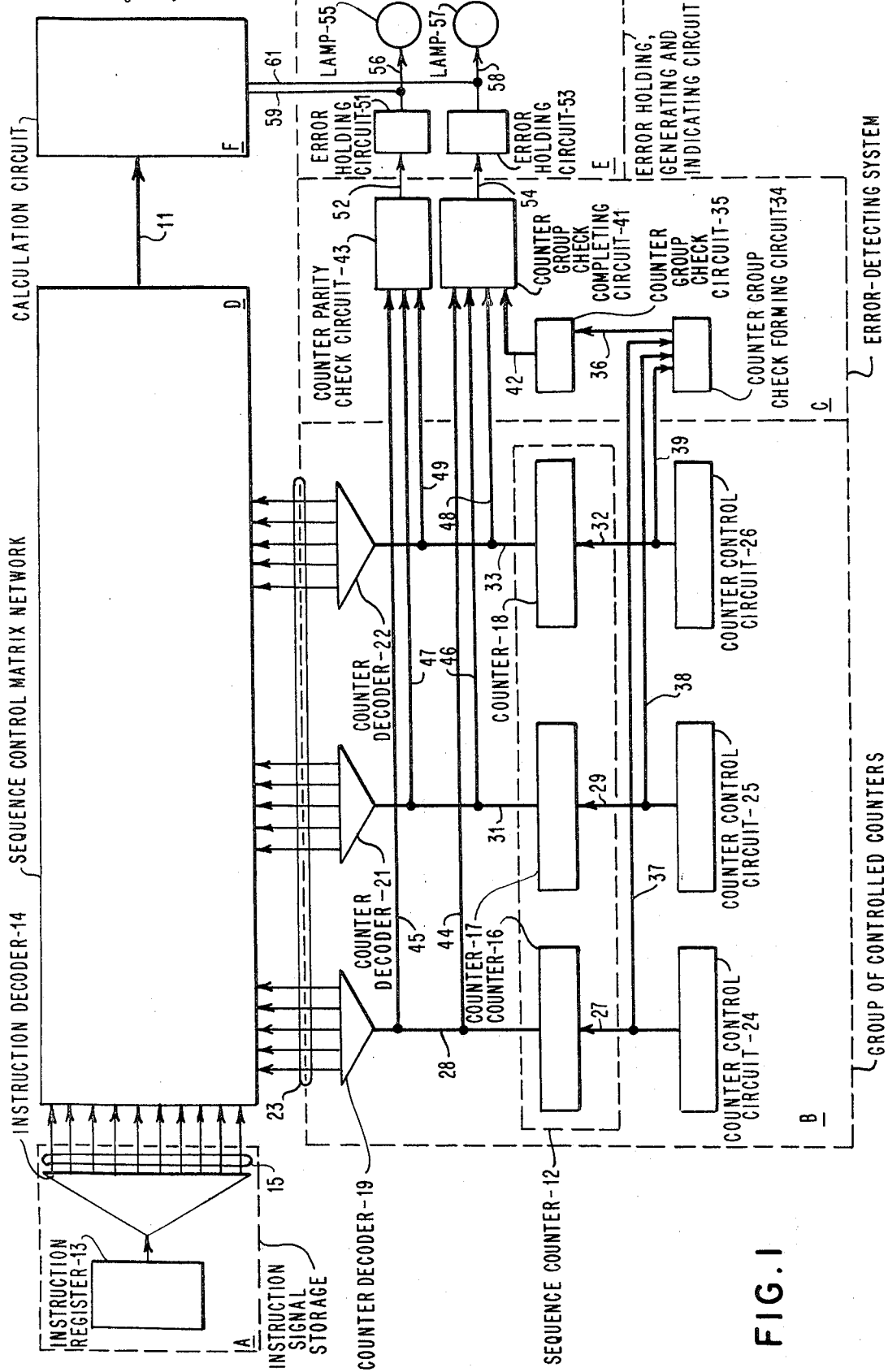
FIG. 1 is a block diagram of an embodiment of the error-detecting system of the present invention in connection with a controlled counter group.

FIG. 1 is a diagram of the central part of the sequence control system. The central part comprises part A in which only the instruction part of the instruction word read out from a memory device (not shown in the figures) is stored. Part B comprises a group of controlled counters for determining the control sequence of the entire computer. The counters operate by receiving pulses from the clock source of the computer. Part C is the error-detecting system of the present invention. Part D is a sequence control matrix network which is connected to the outputs of part A and to the outputs of part B. Part E is an error holding, generating and indicating circuit for storing the output of the error-detecting system C. The holding circuit E instructs calculation circuit F to stop the operation. The calculation circuit F starts the operation by receiving the output of the sequence control network D and stops the operation by receiving the output of the error holding, generating and indicating circuit E.

A plurality of output lines 11 of the control matrix network D, indicated as a cable, are the nervous system, so to speak, of the computer and a plurality of output lines extend from said network to various parts of the computer such as, for example, the adder of the calculation circuit F, the register and the accumulator. Electrical signals are supplied from the network D to the various computer parts such as the calculation circuit F to cause said circuit to operate in a constant time pattern or order.

The calculation parts of the computer such as the calculation circuit F, the register and the accumulator are simultaneously time controlled by the signals in the output leads 11 of the control matrix network D, so that if said control matrix network D is operated erroneously, said calculation circuit is also operated erroneously. It is therefore absolutely necessary to detect erroneous operation of the control network D and to immediately transfer an error indication to the calculation circuit F to stop the succeeding operations. Erroneous operation of the control network D is often caused by erroneous operation of a sequence counter 12 which is included in the group of controlled counters B. Erroneous operation of the sequence counter 12 must be continuously supervised and when an error is detected, an error indication must be transferred immediately to the calculation circuit F. This supervisory operation is accomplished, in accordance with the present invention, by the error-detecting system C.

Operating instructions are stored in an instruction register 13 in code. The instruction register 13 is part of the instruction signal storage A. The instructions stored in the instruction register 13 are decoded by an instruction decoder 14, which supplies the control signals to the control matrix network D through a plurality of lines 15.

The sequence counter 12 of the group of controlled counters B comprises a group of counters 16, 17 and 18 for determining the operating times of the control signals in the lines 15. The contents of the counters 16, 17 and 18, respectively, are decoded by counter decoders 19, 21 and 22, respectively. The counter decoders 19, 21 and 22 supply time control signals to the sequence control matrix network D via a plurality of lines 23.

The counters 16, 17 and 18 of the sequence counter 12 are controlled by counter control circuits 24, 25 and 26, respectively. The counter control circuits 24, 25 and 26 cause the contents of the counters 16, 17 and 18 to step. Thus, each of the counters 16, 17 and 18 has a corresponding counter control circuit and a corresponding counter decoder. Although three counters are shown in the sequence counter 12, there may be a different number of counters therein such as, for example, two, four, or more.

The output of the counter control circuit 24 is connected to the input of the counter 16 via a line 27 and the output of said counter is connected to the input of the counter decoder 19 via lines 28. The output of the counter control circuit 25 is connected to the input of the counter 17 via a line 29 and the output of said counter is connected to the input of the counter decoder 21 via lines 31. The output of the counter control circuit 26 is connected to the input of the counter 18 via a line 32 and the output of said counter is connected to the input of the counter decoder 22 via lines 33.

The counter control circuits 24, 25 and 26 generate pulses at constant time intervals. Each of the counter control circuits 24, 25 and 26 may comprise any suitable pulse generator circuit such as, for example, a crystal oscillator, a multivibrator, or the like. Each of the counters 16, 17 and 18 is stepped one step each time it receives one pulse from the corresponding counter control circuits 24, 25 and 26.

In accordance with the present invention, the error-detecting system C comprises a counter group check forming circuit 34 having an output connected to the input of a counter group check circuit 35 via a line 36, an input connected to the output of the counter control circuit 24 via a line 37, an input connected to the output of the counter control circuit 25 via a line 38 and an input connected to the output of the counter control circuit 26 via a line 39. The output of the counter group check circuit 35 is connected to an input of a counter group check completing circuit 41 via a line 42. The error-detecting system C further comprises a counter parity check circuit 43.

The output of the counter 16 is connected to an input of the counter group check completing circuit 41 via the lines 28 and lines 44 and to an input of the counter parity check circuit 43 via the lines 28 and lines 45. The output of the counter 17 is connected to an input of the counter group check completing circuit 41 via the lines 31 and lines 46 and to an input of the counter parity check circuit 43 via the lines 31 and lines 47. The output of the counter 18 is connected to an input of the counter group check completing circuit 41 via the lines 33 and lines 48 and to an input of the counter parity check circuit 43 via the lines 33 and lines 49.

Figure 2:
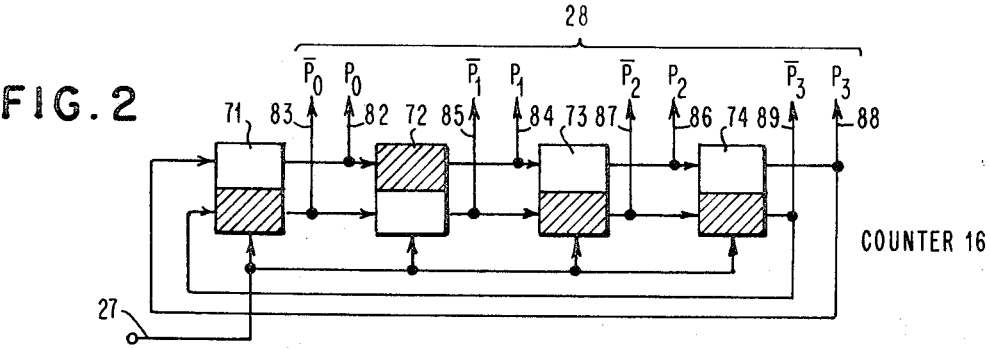
FIG. 2 is a block diagram of a counter which may be utilized as the counter 16 of FIG. 1.
Figure 3:
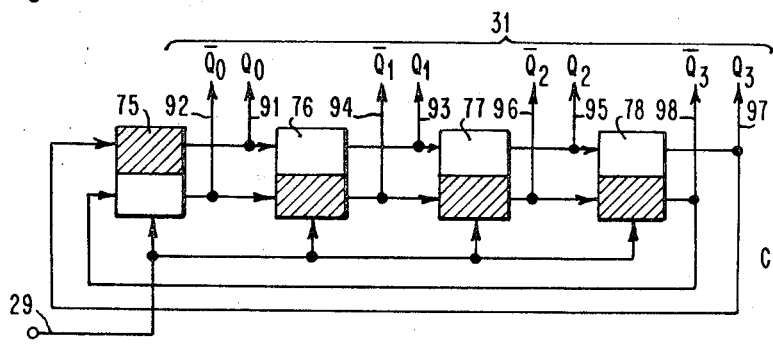
FIG. 3 is a block diagram of a counter which may be utilized as the counter 17 of FIG. 1.
Figure 4:
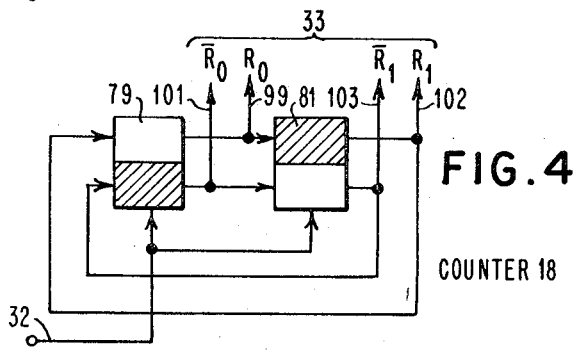
FIG. 4 is a block diagram of a counter which may be utilized as the counter 18 of FIG. 1.

The counter 16 comprises a quaternary ring counter, as shown in FIG. 2, having four flip flops. The counter 17 comprises a quaternary ring counter, as shown in FIG. 3, having four flip flops. The counter 18 comprises a binary ring counter, as shown in FIG. 4, having two flip flops. Each of the lines 28, 31, 33, 44, 45, 46, 47, 48 and 49 is a plurality of lines in a cable, in order to supply the contents of the counters 16, 17 and 18 to the counter decoders 19, 21 and 22, the counter group check completing circuit 41 and the counter parity check circuit 43 in parallel, without modification. Thus, there are eight lines 28, eight lines 44, eight lines 45, eight lines 31, eight lines 46 and eight lines 47. There are four lines 33, four lines 48 and four lines 49.

Each of the counter decoders 19, 21 and 22 may comprise any suitable decoder circuit such as, for example, a diode matrix circuit. The contents of the counters 16, 17 and 18 supplied to the counter decoders 19, 21 and 22 via the lines 28, 31 and 33 are in code and are decoded by said decoders. Each of the counter decoders 19, 21 and 22 then supplies a current via one of its output lines 23.

Figure 5:
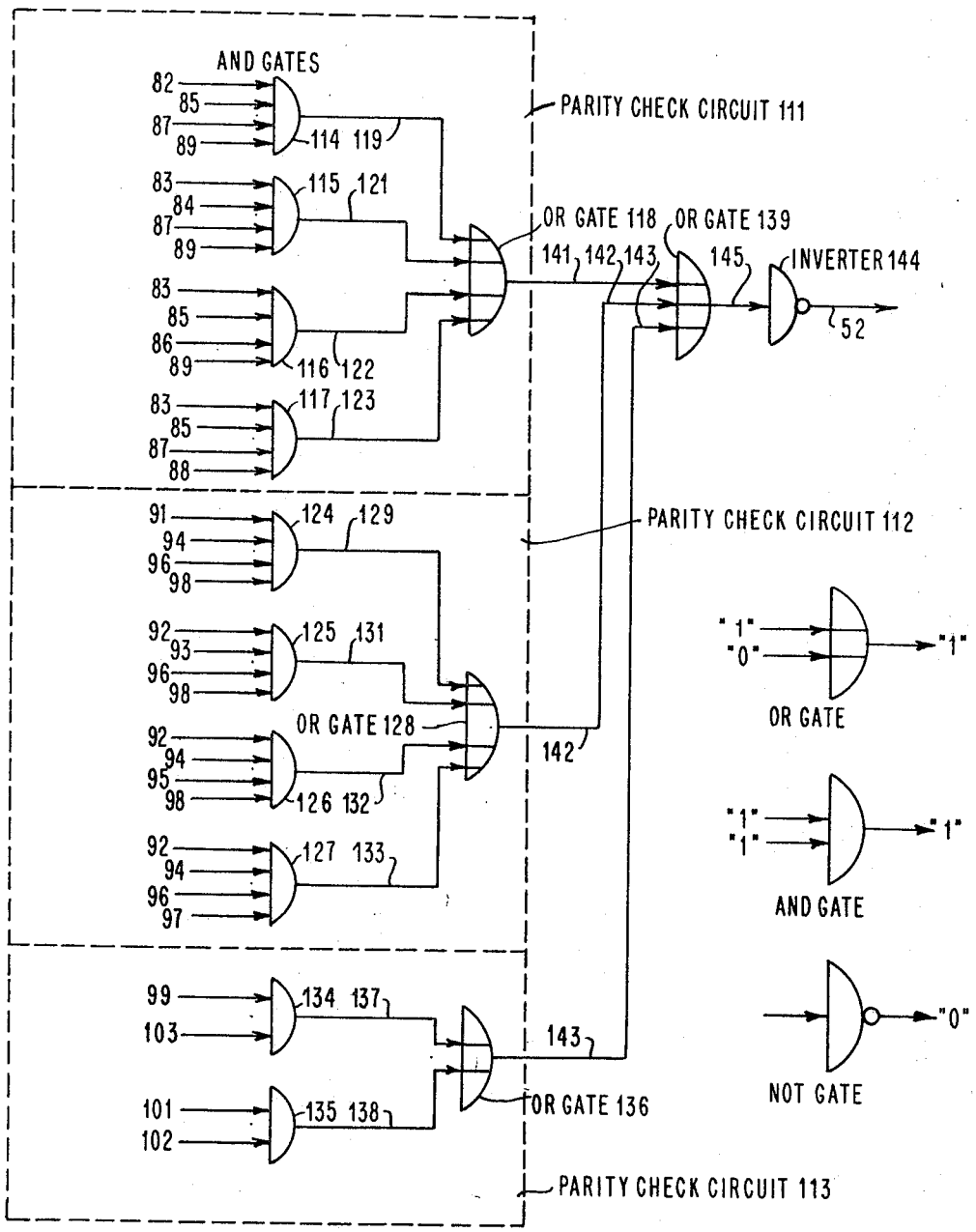
FIG. 5 is a block diagram of a counter parity check circuit which may be utilized as the counter parity check circuit 43 of FIG. 1.

The counter group check circuit 35 of the error-detecting system C comprises a flip flop, as shown in FIG. 7. Erroneous operation of the counters 16, 17 or 18 is detected or determined by the counter parity check circuit 43, as shown in FIG. 5. Erroneous operation of the counters 16, 17 or 18, caused by erroneous operation of the counter control circuits 24, 25 or 26, and errors other than parity errors of said counters, are determined or detected by the counter group check forming circuit 34, the counter group check circuit 35 and the counter group check circuit 35 and the counter group check completing circuit 41, as shown in FIGS. 6, 7 and 8, respectively.

The error holding, generating and indicating circuit E comprises an error holding circuit 51 having an input connected to the output of the counter parity check circuit 43 via a line 52. Another error holding circuit 53 has an input connected to the output of the counter group check completing circuit 41 via a line 54. An indicator or display lamp 55 is connected to the output of the error holding circuit 51 via a line 56. Another indicator or display lamp 57 is connected to the output of the error holding circuit 53 via a line 58. The output of the error holding circuit 51 is connected to the calculation circuit F via the line 56 and a line 59. The output of the error holding circuit 53 is connected to the calculation circuit F via the line 58 and a line 61.

When an error is detected by the counter parity check circuit 43, it indicates that a parity error has occurred in a counter. An error signal is immediately transferred to the error holding circuit 51, which comprises a flip flop, via the line 52. When an error is detected by the counter group check completing circuit 41, it indicates that an error has occurred in the operation of a counter due to erroneous operation of the corresponding counter control circuit, or an error other than a parity error of the counter has occurred. An error signal is immediately transferred to the error holding circuit 53, which also comprises a flip flop, via the line 54.

Erroneous operation of a counter due to error in the counter is indicated by a signal from the error holding circuit 51 supplied to the lamp 55. Erroneous operation of a counter due to erroneous operation of a counter control circuit and an error other than a parity error are indicated by signals from the error holding circuit 53 supplied to the lamp 57. Error signals from both error holding circuits are supplied to the calculation circuit F via the lines 59 and 61 and stop the sequence of operation of the calculation circuit.

FIGS. 2, 3 and 4 show the counters 16, 17 and 18, respectively, in more detail than in FIG. 1. The counter 16 of FIG. 2 comprises four flip flops 71, 72, 73 and 74, connected in sequence. Each of the flip flops 71, 72, 73 and 74 comprises any suitable flip flop or bistable vibrator known in the art. As is well known, a flip flop has two stable states or conditions, the first stable state being the set state and the second stable state being the reset state. The potential of either one of binary information signals "1" or "0" is transferred to the output line.

In the counter 16, as shown in FIG. 2, only the flip flop 72 is in its set condition. The flip flops 71, 73 and 74 are in their reset condition. In the counter 17, as shown in FIG. 3, only the flip flop 75 of flip flops 75, 76, 77 and 78, connected in sequence and comprising said counter, is in its set condition. The flip flops 76, 77 and 78 are in their reset condition. In the counter 18, as shown in FIG. 4, the flip flop 79 of flip flops 79 and 81, connected in sequence and comprising said counter, is in its reset condition. The other flip flop 81 is in its set condition. The flip flops having hatched upper halves are in their set condition and those having hatched lower halves are in their reset condition, in FIGS. 2, 3 and 4.

In FIG. 2, the set and reset outputs of the flip flop 71 are connected to lines 82 and 83, the set and reset outputs of the flip flop 72 are connected to lines 84 and 85, the set and reset outputs of the flip flop 73 are connected to lines 86 and 87 and the set and reset outputs of the flip flop 74 are connected to lines 88 and 89. In FIG. 3, the set and reset outputs of the flip flop 75 are connected to lines 91 and 92, the set and reset outputs of the flip flop 76 are connected to lines 93 and 94, the set and reset outputs of the flip flop 77 are connected to lines 95 and 96 and the set and reset outputs of the flip flop 78 are connected to lines 97 and 98. In FIG. 4, the set and reset outputs of the flip flop 79 are connected to lines 99 and 101 and the set and reset outputs of the flip flop 81 are connected to lines 102 and 103.

In the counter 16 of FIG. 2, the lines 83, 84, 87 and 89 have a high potential and are in logic "1" condition. In the counter 17 of FIG. 3, the lines 91, 94, 96 and 98 have a high potential and are in logic "1" condition. In the counter 18 of FIG. 4, the lines 101 and 102 have a high potential and are in logic "1" condition. The other output lines in FIGS. 2, 3 and 4 are at low potential and are in logic "0" condition.

Logical "1" signals or high potentials applied to the lines 27, 29 and 32 from the counter control circuits 24, 25 and 26, respectively, change the states or conditions of the flip flops. Thus, for example, when counter control circuit 24 generates one high potential pulse, the flip flops of the counter 16 receive said pulse and the states or conditions of said flip flops are changed. Thus, the pulse changes the flip flop 71 from its reset to its set condition and changes the flip flop 72 from its set to its reset condition. The flip flops 73 and 74 are changed from their reset to their set condition. The logical conditions of the output lines are therefore correspondingly changed. The conditions of the flip flops of the counters 17 and 18 are changed in the same manner. Each of the counters 16, 17 and 18 steps one step each time a high potential pulse is applied to it from the corresponding counter control circuit 24, 25 or 26.

In each of the counters 16, 17 and 18, only one flip flop is in its set condition. Therefore, if more than one flip flop is in its set condition in one counter, an error has occurred. The counter parity check circuit 43 of FIG. 5 functions to detect or determine such an error. The counter 16 for example, is operating properly if one of the flip flops 71, 72, 73 and 74 (FIG. 2) is in its set or logical "1" condition, and is operating erroneously if more than one of said flip flops is in its set or logical "1" condition.

Logical "$f$," for indicating the proper operation of the counter may be determined by the following equations. The output lines of FIGS. 2, 3 and 4 correspond to the logical symbols shown in Table I.

| Line: | Logical symbol |
|---|---|
| 83 | $\overline{P}_0$ |
| 82 | $P_0$ |
| 85 | $\overline{P}_1$ |
| 84 | $P_1$ |
| 87 | $\overline{P}_2$ |
| 86 | $P_2$ |
| 89 | $\overline{P}_3$ |
| 88 | $P_3$ |
| 92 | $\overline{Q}_0$ |
| 91 | $Q_0$ |
| 94 | $\overline{Q}_1$ |
| 93 | $Q_1$ |
| 96 | $\overline{Q}_2$ |
| 95 | $Q_2$ |
| 98 | $\overline{Q}_3$ |
| 97 | $Q_3$ |

| Line: | Logical symbol |
|---|---|
| 101 | $\overline{R}_0$ |
| 99 | $R_0$ |
| 103 | $\overline{R}_1$ |
| 102 | $R_1$ |

TABLE I

The parity error detecting logic $f_1$ of the counter 16, the logic $f_2$ of the counter 17 and the logic $f_3$ of the counter 18 may be expressed as:

$$f_1 = P_0 \cdot \overline{P}_1 \cdot \overline{P}_2 \cdot \overline{P}_3 + \overline{P}_0 \cdot P_1 \cdot \overline{P}_2 \cdot \overline{P}_3$$
$$+ \overline{P}_0 \cdot \overline{P}_1 \cdot P_2 \cdot \overline{P}_3 + \overline{P}_0 \cdot \overline{P}_1 \cdot \overline{P}_2 \cdot P_3$$
$$f_2 = Q_0 \cdot \overline{Q}_1 \cdot \overline{Q}_2 \cdot \overline{Q}_3 + \overline{Q}_0 \cdot Q_1 \cdot \overline{Q}_2 \cdot \overline{Q}_3$$
$$+ \overline{Q}_0 \cdot \overline{Q}_1 \cdot Q_2 \cdot \overline{Q}_3 + \overline{Q}_0 \cdot \overline{Q}_1 \cdot \overline{Q}_2 \cdot Q_3$$
$$f_3 = R_0 \cdot \overline{R}_1 + \overline{R}_0 \cdot R_1$$

FIG. 5 is the counter parity check circuit 43 for satisfying the foregoing logical equations. The parity check circuit of FIG. 5 comprises a parity check circuit 111 for the counter 16, a parity check circuit 112 for the counter 17 and a parity check circuit 113 for the counter 18. Thus, the output lines 82 to 89 of the counter 16 (FIG. 2) are connected to the input lines of the same numbers of the parity check circuit 111, the output lines 91 to 98 of the counter 17 (FIG. 3) are connected to the input lines of the same numbers of the parity check circuit 112 and the output lines 99 and 101 to 103 of the counter 18 (FIG. 4) are connected to the input lines of the same numbers of the parity check circuit 113.

The parity check circuit 111 comprises four AND gates 114, 115, 116 and 117. The inputs of the AND gate 114 are the lines 82, 85, 87 and 89. The inputs of the AND gate 115 are the lines 83, 84, 87 and 89. The inputs of the AND gate 116 are the lines 83, 85, 86 and 89. The inputs of the AND gate 117 are the lines 83, 85, 87 and 88. The output of the AND gate 114 is connected to an input of an OR gate 118 via a line 119. The output of the AND gate 115 is connected to an input of the OR gate 118 via a line 121. The output of the AND gate 116 is connected to an input of the OR gate 118 via a line 122. The output of the AND gate 117 is connected to an input of the OR gate 118 via a line 123.

The parity check circuit 112 comprises four AND gates 124, 125, 126 and 127. The inputs of the AND gate 124 are the lines 91, 94, 96 and 98. The inputs of the AND gate 125 are the lines 92, 93, 96 and 98. The inputs of the AND gate 126 are the lines 92, 94, 95 and 98. The inputs of the AND gate 127 are the lines 92, 94, 96 and 97. The output of the AND gate 124 is connected to an input of an OR gate 128 via a line 129. The output of the AND gate 125 is connected to an input of the OR gate 128 via a line 131. The output of the AND gate 126 is connected to an input of the OR gate 128 via a line 132. The output of the AND gate 127 is connected to an input of the OR gate 128 via a line 133.

The parity check circuit 113 comprises two AND gates 134 and 135. The inputs of the AND gate 134 are the lines 99 and 103. The inputs of the AND gate 135 are the lines 101 and 102. The output of the AND gate 134 is connected to an input of an OR gate 136 via a line 137. The output of the AND gate 135 is connected to an input of the OR gate 136 via a line 138.

In FIG. 5, the output of the OR gate 118 is connected to an input of an OR gate 139 via a line 141. The output of the OR gate 128 is connected to an input of the OR gate 139 via a line 142. The output of the OR gate 136 is connected to an input of the OR gate 139 via a line 143. The output of the OR gate 139 is connected to the input of an inverter or NOT gate 144 via a line 145. The output of the inverter 144 is connected to the line 52 (FIG. 1).

Each of the counters 16, 17 and 18 is a shift register comprising the aforedescribed flip flops connected in series and controlled by signals from the corresponding counter control circuits 24, 25 and 26 (FIG. 1). As hereinbefore mentioned, only one flip flop is in its set condition in each counter, when said counter is operating properly. The parity check circuits 111, 112 and 113 supervise the operation of the counters 16, 17 and 18, respectively.

The OR gate 139 (FIG. 5) detects or determines the parity check signals of the counters 16, 17 and 18. Thus, if an error occurs in one of the counters 16, 17 and 18, such error being, for example, that more than one flip flop of such counter is in its set condition, a high potential logical "1" signal is provided at the line 52 of FIG. 5 by the counter parity check circuit 43.

The counter parity check circuit 43 of FIGS. 1 and 5 functions as a counter error detecting circuit but is incapable of detecting errors in the control signals or counter control circuits which control the counters. In accordance with the present invention, this disadvantage is overcome by adding the counter group check forming circuit 34, the counter group check circuit 35 and the counter group check completing circuit 41. These circuits, shown in detail in FIGS. 6, 7 and 8, detect or determine errors in the control signals which control the counters and errors other than parity errors in the counters.

The counter group check forming circuit 34, as shown in FIG. 6, comprises a flip flop 151, to the input of which the line 37 (FIG. 1) is connected, a flip flop 152, to the input of which the line 38 (FIG. 1) is connected, and a flip flop 153, to the input of which the line 39 (FIG. 1) is connected. The set output of the flip flop 151 is connected to an input of an AND gate 154 via a line 155 and to an input of an AND gate 156 via the line 155 and a line 157. The reset output of the flip flop 151 is connected to an input of an AND gate 158 via a line 159 and to an input of an AND gate 161 via the line 159 and a line 162.

The set output of the flip flop 152 is connected to an input of the AND gate 158 via a line 163 and to an input of the AND gate 154 via the line 163 and a line 164. The reset output of the flip flop 152 is connected to an input of the AND gate 156 via a line 165 and is connected to an input of the AND gate 161 via the line 165 and a line 166. The set output of the flip flop 153 is connected to an input of the AND gate 154 via a line 167 and to an input of the AND gate 161 via the line 167 and a line 168. The reset output of the flip flop 153 is connected to an input of the AND gate 156 via a line 169 and to an input of the AND gate 158 via the line 169 and a line 171.

The output of the AND gate 154 is connected to an input of an OR gate 172 via a line 173. The output of the AND gate 156 is connected to an input of the OR gate 172 via a line 174. The output of the AND gate 158 is connected to an input of the OR gate 172 via a line 175. The output of the AND gate 161 is connected to an input of the OR gate 172 via a line 176. The line 36 of FIG. 1 is connected to the output of the OR gate 172.

The counter group check forming circuit 34 (FIGS. 1 and 6) functions to change the flip flop which constitutes the counter group check circuit 35 to its set condition, as shown in Table II, when the number of steps of one counter of the counter group is an odd number, and changes said flip flop to its reset condition when said number is not an odd number. When a control signal in the counter input lines 27, 29 or 32 is erroneous or improper, the error is detected by the counter group check forming circuit 34. The counter group check forming circuit 34 comprises an even number of detecting circuits and an even number of check sum detecting circuits corresponding to the counters 16, 17 and 18. When the contents of the first, second and third counters 16, 17 and 18 are in specific patterns, the counter group check forming circuit 34 functions to change the counter group check flip flop to its set or "1" condition or to its reset or "0"

condition, accordingly. These patterns are shown in Table II.

TABLE II

| Counter 16 | Counter 17 | Counter 18 | Flip flop of counter group check circuit 35 |
|---|---|---|---|
| $P_0$ | $Q_0$ | $R_0$ | Reset. |
| $P_0$ | $Q_0$ | $R_1$ | Set. |
| $P_0$ | $Q_1$ | $R_0$ | Set. |
| $P_0$ | $Q_1$ | $R_1$ | Reset. |
| $P_0$ | $Q_2$ | $R_0$ | Do. |
| $P_0$ | $Q_2$ | $R_1$ | Set. |
| $P_0$ | $Q_3$ | $R_0$ | Set. |
| $P_0$ | $Q_3$ | $R_1$ | Reset. |
| $P_1$ | $Q_0$ | $R_0$ | Set. |
| $P_1$ | $Q_0$ | $R_1$ | Reset. |
| $P_1$ | $Q_1$ | $R_0$ | Do. |
| $P_1$ | $Q_1$ | $R_1$ | Set. |
| $P_1$ | $Q_2$ | $R_0$ | Set. |
| $P_1$ | $Q_2$ | $R_1$ | Reset. |
| $P_1$ | $Q_3$ | $R_0$ | Do. |
| $P_1$ | $Q_3$ | $R_1$ | Set. |
| $P_2$ | $Q_0$ | $R_0$ | Reset. |
| $P_2$ | $Q_0$ | $R_1$ | Set. |
| $P_2$ | $Q_1$ | $R_0$ | Set. |
| $P_2$ | $Q_1$ | $R_1$ | Reset. |
| $P_2$ | $Q_2$ | $R_0$ | Do. |
| $P_2$ | $Q_2$ | $R_1$ | Set. |
| $P_2$ | $Q_3$ | $R_0$ | Set. |
| $P_2$ | $Q_3$ | $R_1$ | Reset. |
| $P_3$ | $Q_0$ | $R_0$ | Set. |
| $P_3$ | $Q_0$ | $R_1$ | Reset. |
| $P_3$ | $Q_1$ | $R_0$ | Do. |
| $P_3$ | $Q_1$ | $R_1$ | Set. |
| $P_3$ | $Q_2$ | $R_0$ | Set. |
| $P_3$ | $Q_2$ | $R_1$ | Reset. |
| $P_3$ | $Q_3$ | $R_0$ | Do. |
| $P_3$ | $Q_3$ | $R_1$ | Set. |

Figure 9:
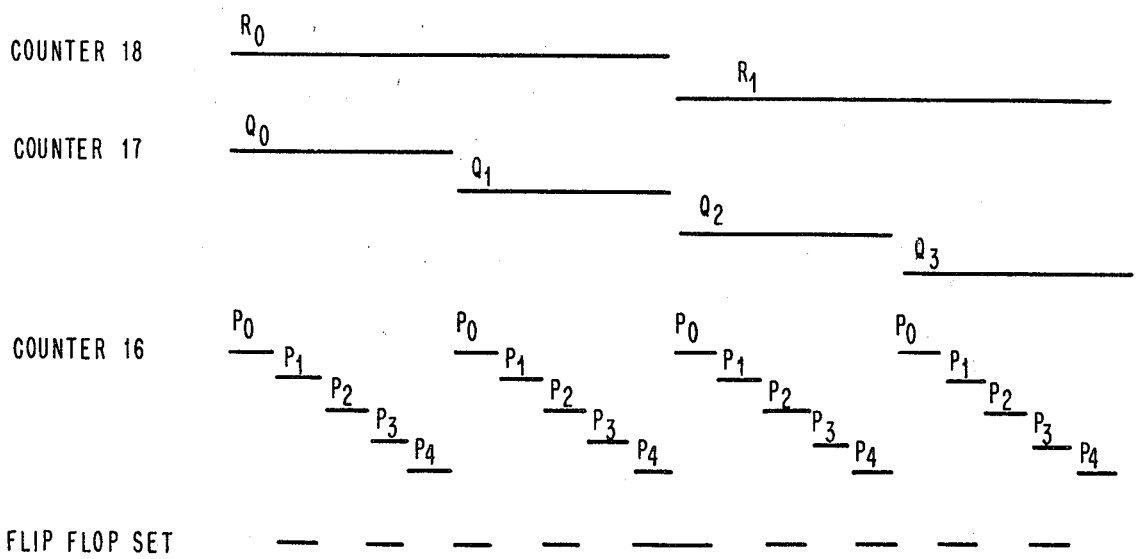
FIG. 9 is a graphical presentation of Table II.

FIG. 9 is a graphical presentation of Table II. Only when one or three of the counters 16, 17 and 18 has an odd number content does the flip flop of the counter group check circuit 35 change to its set or "1" condition. This is a predetermined rule. As indicated in Table II, it is first determined that when the contents of the counters 16, 17 and 18 are $P_0$, $Q_0$ and $R_0$, respectively, the flip flop of the counter group check circuit 35 is in its reset condition, and when the contents of said counters are $P_0$, $Q_0$ and $R_1$, respectively, said flip flop is in its set condition, and so on. The logical circuit functions in accordance with the patterns of Table II and provides the counter group check forming.

In FIG. 6, the flip-flops 151, 152 and 153 indicate whether the numbers of signals received from the counter control circuits 24, 25 and 26 (FIG. 1) via the lines 37, 38 and 39 are odd or even. When the set output of a flip flop is "1," it means that an odd number of signals have been received and when the reset output is "1," it means that an even number of signals have been received. The logical circuit comprising the AND gates and the OR gate in the succeeding stage receives the output signal and the OR gate 172 provides an output signal in accordance with the table. The logical circuit 34 of FIG. 6 is in accordance with the equation.

Output "0" of the counter group check forming circuit $$34 = R_0 \cdot Q_0 \cdot (P_0 + P_2 + P_4) + R_0 \cdot Q_1 \cdot (P_1 + P_3)$$
$$+ R_1 \cdot Q_2 (P_1 + P_3) + R_1 \cdot Q_3 \cdot (P_0 + P_2)$$

FIG. 7 shows the counter group check circuit 35 of FIG. 1. As hereinbefore mentioned, the counter group check circuit 35 comprises a flip flop 181. The flip flop 181 is supplied with signals from the counter group check forming circuit 34 via the line 36. The reset output of the flip flop 181 is connected to the counter group check completing circuit 41 via the line 42 (FIG. 1).

FIG. 8 illustrates the counter group check completing circuit 41 of FIG. 1. In FIG. 8, the output signals of the counters 16, 17 and 18 (FIG. 1) are supplied to an input of an AND gate 182 via a line 183, two inputs of an OR gate 184 via lines 185 and 186, two inputs of an OR gate 187 via lines 188 and 189 and an input of an AND gate 191 via a line 192. The output of the counter group check circuit 35 (FIG. 1) is connected to an input of an AND gate 193 via the line 42 (FIG. 1).

The output of the OR gate 184 is connected to an input of an AND gate 194 via a line 195 and to an input of an AND gate 196 via the line 195, a line 197 and a NOT gate or inverter 198 connected in the line 197. The output of the OR gate 187 is connected to an input of the AND gate 194 via a line 199 and to an input of the AND gate 196 via the line 199, a line 201 and an inverter or NOT gate 202 connected in the line 201. The output of the AND gate 194 is connected to an input of an OR gate 203 via a line 204 and the output of the AND gate 196 is connected to an input of the OR gate 203 via a line 205.

The output of the OR gate 203 is connected to an input of the AND gate 182 via a line 206 and to an input of the AND gate 191 via the line 206, a line 207 and an inverter or NOT gate 208 connected in the line 207. The output of the AND gate 182 is connected to an input of an OR gate 209 via a line 211. The output of the AND gate 191 is connected to an input of the OR gate 209 via a line 212. The output of the OR gate 209 is connected to an input of the AND gate 193 via a line 213.

When there is a logical "1" signal in each input of the AND gate 193, it indicates that an error has occurred due to an error in a counter or in a counter control circuit. The signal transferred by the AND gate 193 is immediately transferred to the error holding circuit 53 via the line 54 (FIG. 1). Erroneous operation occurs when the line 42 is at a high potential or logical "1," that is, when one or three of the three counters 16, 17 and 18 has or have odd numbered contents, and erroneous operation actually occurs when one or three of said three counters does not or do not have odd numbered contents. The counter group check completing circuit of FIG. 8 functions to switch the AND gate 193 to its conductive condition when the result of the operation of the counter group check forming circuit of FIG. 6, due to the presence of signals in the lines 37, 38 or 39, differs from the result of the operation of the counter group check circuit 35 of FIG. 7, due to the presence of a signal in the line 36.

As hereinbefore described, my invention provides a novel check or error-detecting system applicable to a computer, which is capable of determining whether the operation of the counters is proper or whether control signals for the counters are proper. This is accomplished by a parity check circuit for confirming the operation of the counters and a check circuit for checking the counter group.

While the invention has been described by means of a specific example and in a specific embodiment, I do not wish to be limited thereto, for obvious modifications will occur to those skilled in the art without departing from the spirit and scope of the invention.

I claim:

1. An error-detecting system for a group of controlled counters, each of said counters having an input and an output and being controlled by a control signal from a corresponding counter control circuit connected to its input, said system comprising a counter parity check circuit connected to the output of each of said counters for responding to determined patterns of operation of said counters;

counter group check forming circuit means connected to said counter control circuits for producing check signals in accordance with control signals supplied to said counters;

counter group check circuit means connected to said counter group check forming circuit means for storing signals produced by said counter group check forming circuit means; and counter group check completing circuit means connected to said counter group check circuit means and to the output of each of said counters for collating the contents of the group of counters with the contents of said counter group check circuit means, said counter group check completing circuit means operating when the input signals supplied to it are in a specific pattern.

2. An error-detecting system as claimed in claim 1, wherein said counter group check circuit means comprises a flip flop.

3. An error-detecting system as claimed in claim 1, wherein said counter group check forming circuit means, said counter group check circuit means and said counter group check completing circuit means detect erroneous operation of the counter control circuits and errors other than parity errors of the counters.

4. An error-detecting system as claimed in claim 1, further comprising first error indicating means coupled to the output of said counter parity check circuit for indicating erroneous operation of a counter due to error in such counter and second error indicating means coupled to the output of said counter group check completing circuit for indicating erroneous operation of a counter control circuit and errors other than parity errors.

5. An error-detecting system as claimed in claim 1, wherein said counter group check circuit means comprises a flip flop circuit and said counter group check forming circuit means comprises a logic circuit which changes said flip flop circuit to one of its set and reset conditions when the numebr of steps of a counter of the counter group is one of an odd and an even number and changes said flip flop circuit to its other condition when the number of steps of said counter is the other of an odd and an even number.

6. An error-detecting system as claimed in claim 1, wherein said counter group check forming circuit comprises a logic circuit which detects errors in the control signals supplied from the counter control circuits to the counters.

References Cited

UNITED STATES PATENTS

| 3,266,020 | 8/1966 | Cheney et al. | 340—172.5 |
| 3,372,382 | 3/1968 | Newman | 340—172.5 |
| 3,274,564 | 9/1966 | Binder et al. | 340—172.5 |

EUGENE G. BOTZ, Primary Examiner

C. E. ATKINSON, Assistant Examiner

U.S. Cl. X.R.

340—146.1, 172.5